US012320171B2

(12) United States Patent
Keskin

(10) Patent No.: US 12,320,171 B2
(45) Date of Patent: Jun. 3, 2025

(54) SLIDING LATCH FOR GALLEY BAY DOORS

(71) Applicant: B/E Aerospace, Inc., Winston-Salem, NC (US)

(72) Inventor: Volkan Keskin, Enfield (GB)

(73) Assignee: B/E AEROSPACE INC., Winston-Salem, NC (US)

( * ) Notice: Subject to any disclaimer, the term of this patent is extended or adjusted under 35 U.S.C. 154(b) by 271 days.

(21) Appl. No.: 17/122,561

(22) Filed: Dec. 15, 2020

(65) Prior Publication Data

US 2022/0186535 A1    Jun. 16, 2022

(51) Int. Cl.
*E05C 1/04* (2006.01)
*B64D 11/04* (2006.01)
*E05C 1/00* (2006.01)

(52) U.S. Cl.
CPC .............. *E05C 1/04* (2013.01); *B64D 11/04* (2013.01); *E05C 1/004* (2013.01)

(58) Field of Classification Search
CPC ........... Y10T 292/096; Y10T 292/1014; Y10T 292/1056; Y10S 292/63; Y10S 292/51; E05C 1/02; E05C 1/04; E05C 1/004; E05C 7/04; E05C 7/00
See application file for complete search history.

(56) References Cited

U.S. PATENT DOCUMENTS

| | | | | |
|---|---|---|---|---|
| 840,666 | A * | 1/1907 | Sliga | E05B 37/00 70/306 |
| 3,897,093 | A * | 7/1975 | Wiczer | E05B 47/0002 292/144 |
| 5,235,833 | A | 8/1993 | Pinto | |
| 6,139,034 | A | 10/2000 | Williams | |
| 6,357,806 | B1 | 3/2002 | Saku | |
| 6,499,775 | B2 | 12/2002 | Fujiwara | |
| 9,738,387 | B2 | 8/2017 | Holtorf et al. | |
| 10,047,549 | B2 | 8/2018 | Grant et al. | |
| 2015/0007623 | A1 * | 1/2015 | Alghamdi | E05C 1/04 292/137 |
| 2018/0273157 | A1 * | 9/2018 | Hoogeveen | E05D 15/264 |

(Continued)

FOREIGN PATENT DOCUMENTS

EP        1132556 A2 *  9/2001  ......... E05B 17/0045

OTHER PUBLICATIONS

Extended European Search Report for European Patent Application No. EP21214885.2, dated Apr. 25, 2022.

(Continued)

*Primary Examiner* — Gilbert Y Lee
*Assistant Examiner* — Yahya Sidky
(74) *Attorney, Agent, or Firm* — SNELL & WILMER L.L.P.

(57) ABSTRACT

A galley bay door system comprises a slider housing configured to be mounted in a galley bay door. The system also includes a slider mounted in the slider housing and configured for sliding movement relative to the slider housing, a slider plate mounted to the slider for movement together with the slider. A method comprises securing contents in a galley trolley with a door on the galley trolley and providing secondary retention for the contents in the galley trolley by closing the galley trolley inside a galley bay with a door of the galley bay.

10 Claims, 4 Drawing Sheets

(56) References Cited

U.S. PATENT DOCUMENTS

2019/0024407 A1* 1/2019 Cheng ................ E05B 65/0864

OTHER PUBLICATIONS

N.N.: "Burg-Wachter Produktkatalog 2020", Jan. 20, 2020 (Jan. 20, 2020), pp. 1-151, XP055911667, Dortmund, Germany. Retrieved from the Internet: URL:https://www.burg.biz/wp-content/uploads/2020/02/Ansicht_PW_Produkt-Katalog_2020_ gesamt_klein.pdf <URL:https://www.burg.biz/wp-content/uploads/2020/02/Ansicht_PW_Produkt-Katalog_2020_%20gesamt_klein.pdf> [retrieved on Apr. 11, 2022].
European Patent Office, European Office Action dated Feb. 12, 2024 in Application No. 21214885.2.

* cited by examiner

SLIDING LATCH FOR GALLEY BAY DOORS

BACKGROUND

1. Field

The disclosure relates generally to aircraft galley equipment, and more particularly to securing contents of galley trolleys.

2. Description of Related Art

Trolley doors do not have a secondary retention, such as a long turn button, therefore galley trolley-bay doors must traditionally act as the secondary retention of trolley contents. However, traditionally there is no substantiation of the requirement for secondary retention of the trolley contents by the trolley bay door.

The conventional techniques have been considered satisfactory for their intended purpose. However, there is an ever present need for improved systems and methods for retention of trolley contents. This disclosure provides a solution for this need.

SUMMARY

A galley bay door system comprises a slider housing configured to be mounted in a galley bay door. The system also includes a slider mounted in the slider housing and configured for sliding movement relative to the slider housing and a slider plate mounted to the slider for movement together with the slider.

The slider can be configured to slide between a first and second position. In the first position of the slider, the slider plate can extend beyond housing to secure a galley bay door in a closed state. In the second position of the slider, the slider plate can be withdrawn into the housing relative to the first position to allow opening the galley bay door from the closed state.

The system can further include the galley bay door and the slider housing can be mounted in the gallery bay door. They system can include a door frame and the galley bay door can be hingedly mounted to the door frame. The door frame can include a strike plate configured to receive the slider plate in the first position of the slider. The strike plate can be mounted to the door frame in a position that aligns the slider plate with an opening of the strike plate for securing the galley bay door to the door frame with the slider in the first position.

In embodiments, the system can also include a first galley bay door where the slider housing can be mounted in the first galley bay door, a second galley bay door. A door frame may be included where the first and second galley bay doors can each hingedly mounted to the door frame as a double door pair. The second galley bay door can include a strike plate configured to receive the slider plate in the first position of the slider. The strike plate can be mounted to the second galley bay door in a position that aligns the slider plate with an opening of the strike plate for securing the first galley bay door to the second galley bay door with the slider in the first position.

The slider and slider plate can be configured to displace at least 22 mm between the first and second positions. The slider and slider plate can be configured to displace at least 30 mm between the first and second positions. The slider plate can be slidingly seated in a channel of the housing for guiding the slider plate without a guide separate from the housing. The channel can be open on both ends of the housing so in the second position, a portion of the slider plate extends beyond the channel.

The system can include a slider handle mounted to the slider for manual engagement to actuate the slider. The slider housing can include a dividing wall separating the slider from the slider handle. The slider handle can engage the slider through a slot in the dividing wall. A spacer block surrounding an outer periphery of the housing and a back plate mounted to the housing can also be included. The housing and back plate can be configured to clamp a galley bay door therebetween to mount the system to the galley bay door.

A method comprises securing contents in a galley trolley with a door on the galley trolley and providing secondary retention for the contents in the galley trolley by closing the galley trolley inside a galley bay with a door of the galley bay. The door of the galley bay includes a slider for securing the galley bay door in a closed position. Securing the galley bay door in the closed position can include sliding the slider at least 30 mm. The door of the galley bay can be a first door and can further include a second door of the galley bay. Securing the galley bay door in a closed position can include securing the first and second galley bay doors together.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
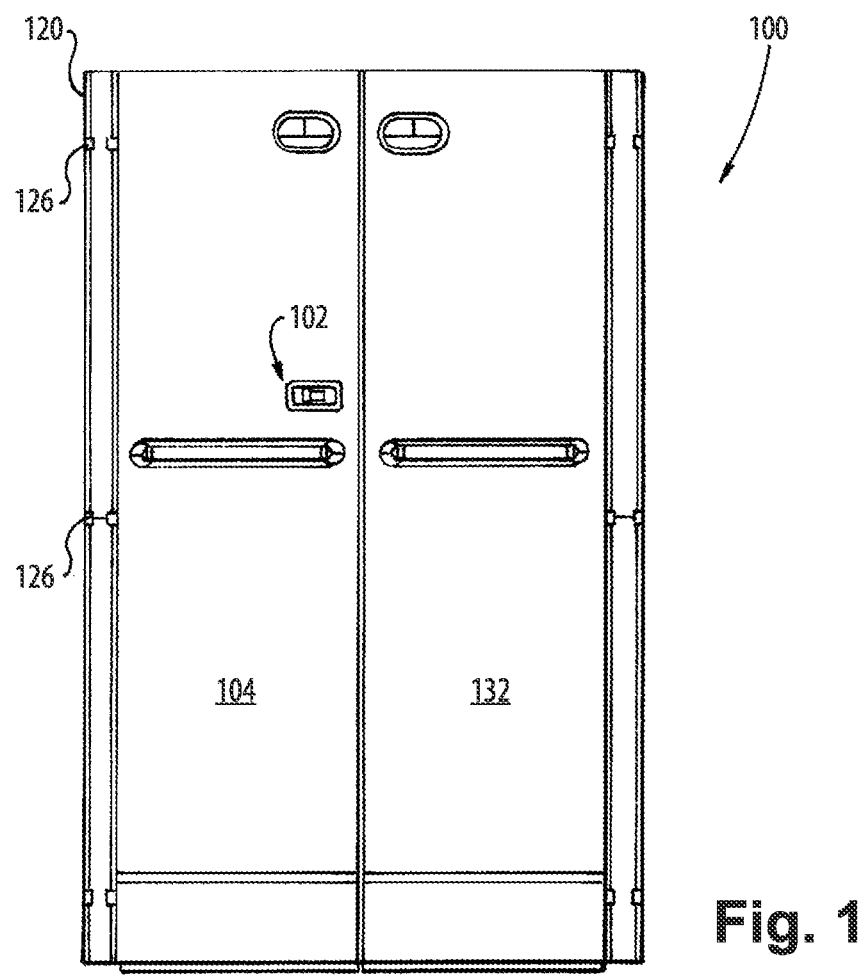
FIG. 1 is a schematic view of an embodiment of a galley bay door system constructed in accordance with the present disclosure, showing from the outside a double galley bay door having a sliding locking system.
Figure 2:
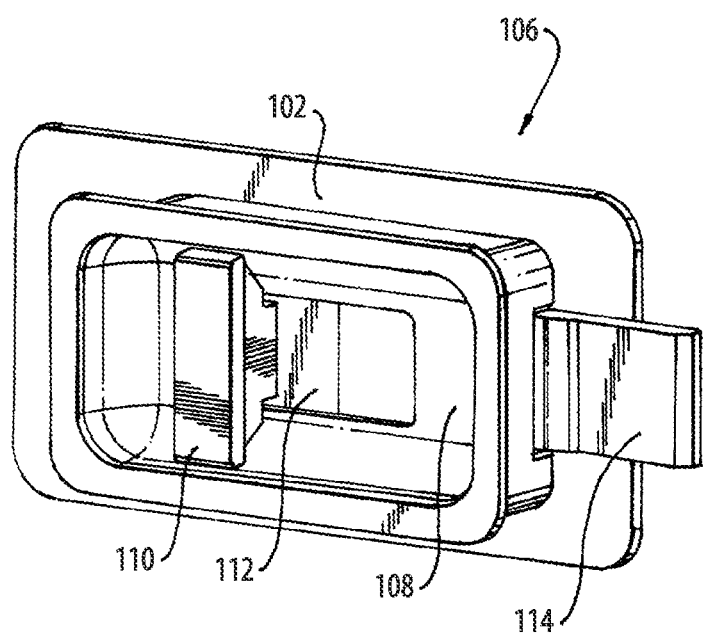
FIG. 2 is a schematic perspective view of the sliding locking system of FIG. 1.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS.

2-6, as will be described. The systems and methods described herein can be used to improve retention of trolley contents.

Figure 3:
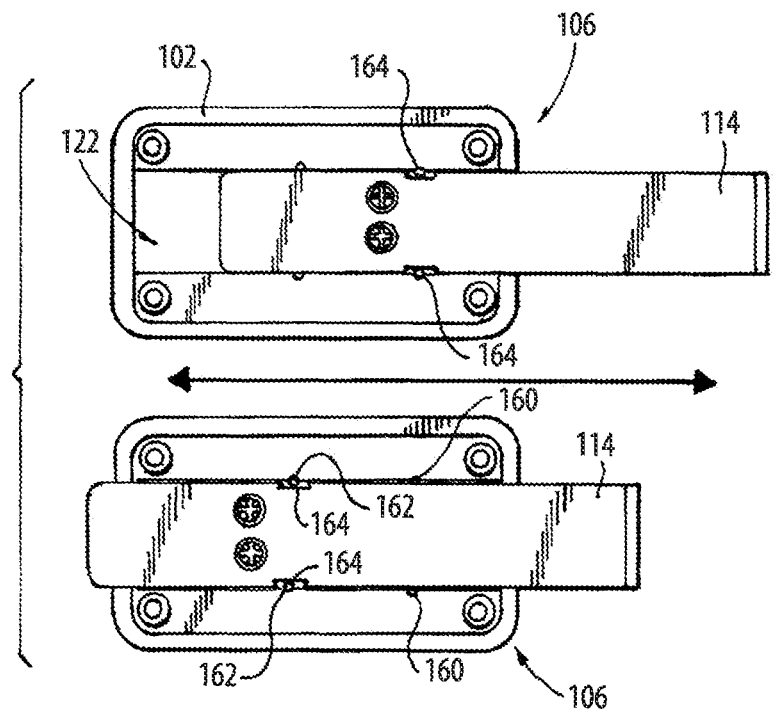
FIG. 3 is a schematic view of the sliding locking system of FIG. 1 showing the locking system in a first position and a second position.

Referring to FIGS. 1-4, a galley bay door system 100 can include a slider housing 102 configured to be mounted in a galley bay door 104. The system 100 can also include a slider 106 mounted in the slider housing 102 and configured for sliding movement relative to the slider housing 102. For example, the slider housing 102 can include a dividing wall 108 separating the slider 104 from a slider handle 110. The slider handle 110 can thus engage the slider 106 through a slot 112 in the dividing wall 108 for manual engagement to actuate the slider 106. A slider plate 114 can be mounted to the slider 106 for movement together with the slider 106. As shown in FIG. 3, the slider plate 114 can be slidingly seated in a channel 122 of the housing 102 for guiding the slider plate 114 between the first and second positions without an additional guide separate from the housing 102. Further, the channel can be open on both ends of the housing 102 so that in the second position, a portion of the slider plate 114 can extend beyond the channel 122. Allowing the slider plate 114 to extend beyond the housing in the second position allows for a longer stroke of the slider 106 and slider plate 114 without increasing the size of the housing 102, thereby reducing the overall size of the system 100.

Figure 4:
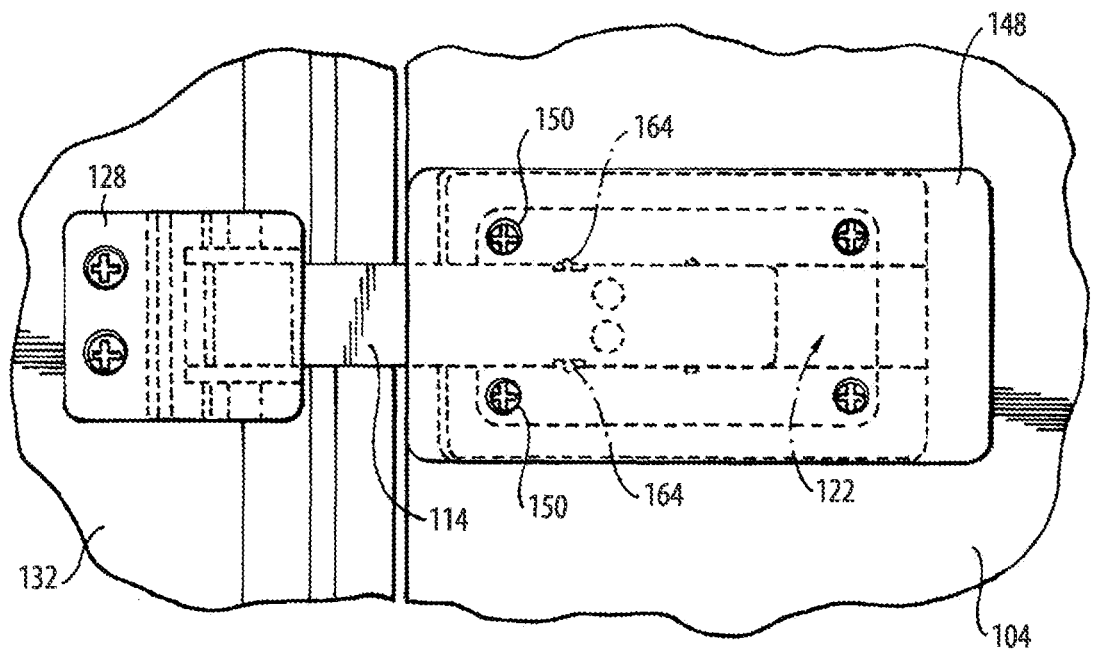
FIG. 4 is a schematic interior view of the sliding locking system of FIG. 1 showing the locking system installed in a galley bay double door.
Figure 5:
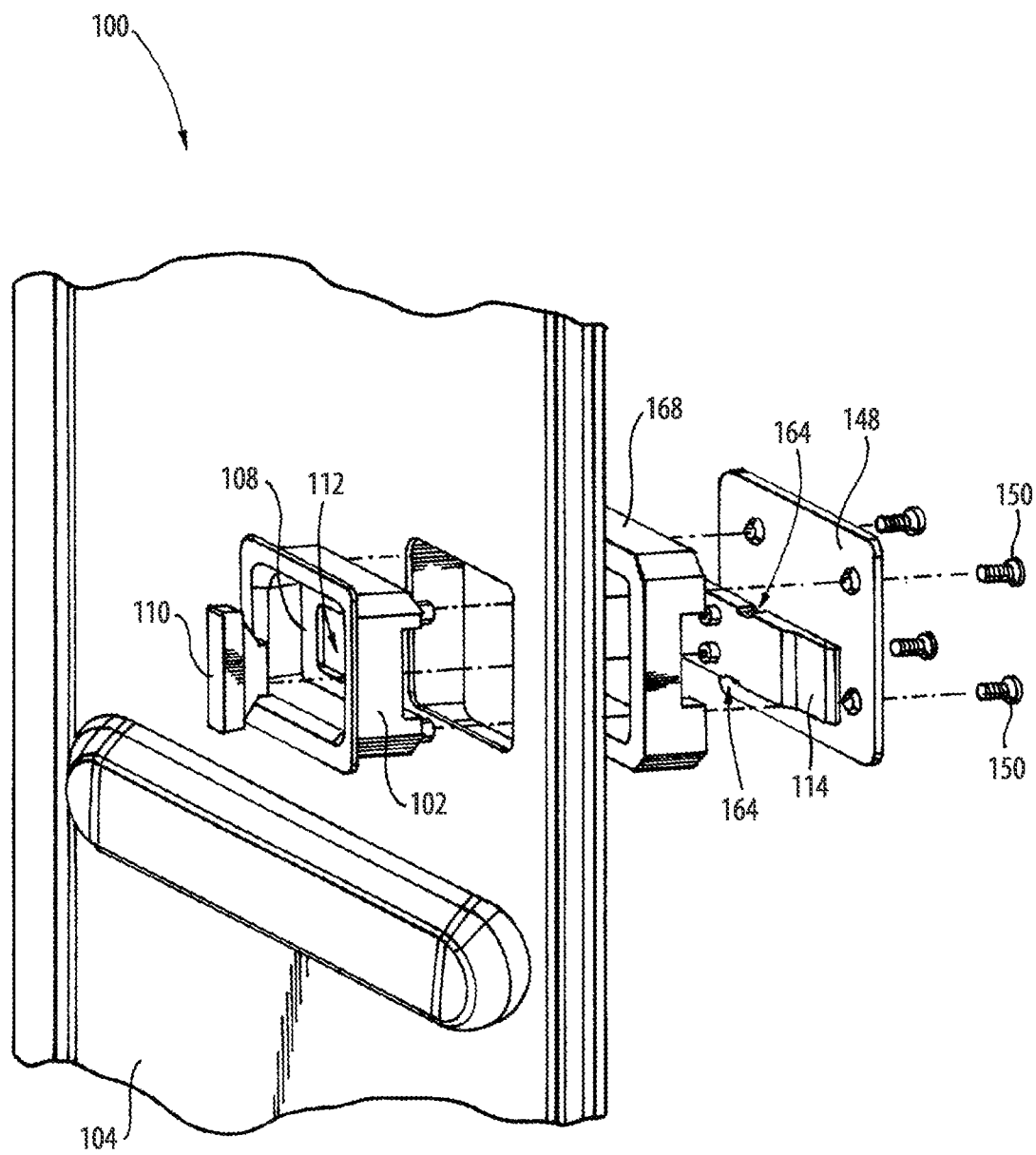
FIG. 5 is an exploded side perspective view of the locking system of FIG. 1 showing the assembly of the locking system within a galley door.

The slider housing 102 can be mounted in the galley bay door 104 in any suitable position. A door frame 120 can be included such that the galley bay door 104 can be hingedly mounted to the door frame 120 (e.g. via hinge 126). The door frame 120 can include a strike plate 128 for receiving the slider plate 114 when the slider 106 is in the first position. Though not explicitly shown here, it should be appreciated that the strike plate 128 can be mounted in the door frame 120 in the same or similar manner as a second galley bay door 132 as shown in FIG. 4, i.e. in a single-door system rather than the double door system shown. The strike plate 128 can be mounted to the door frame 120 in a position that aligns the slider plate 114 with an opening 130 of the strike plate 128. While the slider housing 102 and strike plate 128 may be mounted to the galley door 104 and door frame 120 respectively in any suitable position, the slider housing 102 and the strike plate 128 should be placed in the same position with respect to each other so that when the slider 106 is in the first position, the slider plate 114 may properly engage with the opening 130 with the strike plate 128 such as shown in FIG. 4.

The slider 106 can slide between a first position and a second position as shown by the arrow in FIG. 3 (e.g. a first position can be an engaged or locked position and the second position can be a disengages or unlocked position). When the slider 106 is in the first position (e.g. locked), the slider plate 114 can extend beyond the housing 102 to secure the galley bay door 104 in a closed state. When the slider 106 is in the second position (e.g. unlocked), the slider plate 114 can be withdrawn into the housing 102 relative to the first position to allow opening the galley bay door 104 from the closed state. The slider housing 102 can also contain detents 160,162 configured to receive respective detent balls 164 on the slider plate 114. In the first position, detent balls 164 can engage detents 160, and in the second position, the detent balls 164 can engage with detents 162. The detents 160,162 and detent balls 164 are provided so that the slider 106 and slider plate 114 cannot move between the first and second position without sufficient force applied. For example, rattling or shaking of galley contents during flight or a turbulent event should not be able to dislodge the slider 106 and slider plate 114 from either position, but the force required should be such that flight staff may be able to move the slider 106 and slider plate 114 between the first and second positions relatively easily.

In embodiments such as shown in FIGS. 1 and 4 (e.g. for chilled double door compartments in the galley), the system 100 can also include a first galley bay door 104 and a second galley bay door 132, each can be hingeldy mounted to the door frame 120. The slider housing 102 can be mounted in the first gallery bay door 104, and the strike plate 128 can be mounted in the second galley bay door 132 in a position that aligns with the slider housing 102 so that the slider plate 114 may properly engage with the opening 130 in the strike plate 128 when the slider 106 is in the first position (e.g. as shown in FIG. 4).

The slider 106 and slider plate 114 can displace 22 mm between the first and second positions, however the displacement distance may be extended or reduced so that the slider 106 and slider plate 114 can be configured and adapted to displace the necessary distance of an already existing galley door system. A spacer block 168 (e.g. a machine block) can surround an outer periphery of the housing 102 and can be mounted to the door 104, for example using any suitable adhesive. A back plate 148 can be mounted to the housing 102 (e.g. by a plurality of fasteners 150), so that the housing 102 and back plate 148 are configured to clamp a galley bay door therebetween to mount the system 100 to the galley bay door 104.

Figure 6:
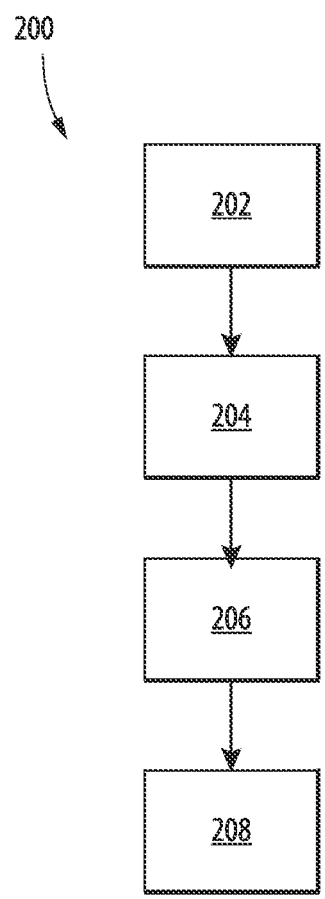
FIG. 6 is a schematic box diagram of a method in accordance with at least one aspect of this disclosure.

Shown in FIG. 6, a method 200 can include, at box 202, securing contents in a galley trolley with a door on the galley trolley. At box 204, the method can include providing secondary retention for the contents in the galley trolley by closing the galley trolley inside a galley bay with a door of the galley bay. The door of the galley bay can a galley bay door system 100 as described above. Securing the galley bay door in the closed position can include, as shown at box 206, sliding the slider at least 22 mm. If the galley bay contains more than one door (e.g. doors 104 and 132), securing the galley bay door in a closed position can include securing the first and second galley bay doors together, as shown at box 208.

Conventional galley trolley doors do not have a secondary retention mechanism to keep the trolley doors closed, so the galley trolley-bay doors (e.g. doors 104,132) must act as means secondary retention of trolley contents. Typically, galley bay doors have only a single locking mechanism for each door usually located near the top of the door. However, the galley bay doors need to be able to withstand up to or at least 500 kg of force from the galley contents. Due to such force, the galley bay doors had a higher failure rate, particularly near the bottom of the door. The systems and methods disclosed herein provide a solution for this need.

The methods and systems of the present disclosure as described above and shown in the drawings, therefore provide for an improved secondary locking mechanism having light weight design that can reduce the number of overall components needed for retention of trolley contents. While the apparatus and methods of the subject disclosure have been shown and described, those skilled in the art will readily appreciate that changes and/or modifications may be made thereto without departing from the scope of the subject disclosure.

What is claimed is:

1. A galley bay door system comprising:
a first galley bay door;
a slider housing configured to be received through the first galley bay door and having a slot;
a back plate mounted to the housing, wherein the slider housing and the back plate are configured to clamp the first galley bay door therebetween to mount the system to the first galley bay door;
a slider plate mounted to the back plate, slidingly seated in a recessed channel of the slider housing for guiding the slider plate without a guide separate from the housing, and configured for sliding movement relative to the slider housing between a first position and a second position, wherein the recessed channel is open on both ends of the slider housing such that in the second position a portion of the slider plate extends beyond the recessed channel;
a slider handle mounted through the slider housing, through the slot, and to the slider plate;
a second galley bay door;
a strike plate mounted in the second galley bay door configured to receive the slider plate in the first position, wherein the strike plate is mounted to the second galley bay door in a position that aligns the slider plate with an opening of the strike plate for securing the first galley bay door to the second galley bay door with the slider plate in the first position;
a door frame, wherein the first and second galley bay doors are each hingedly mounted to the door frame as a double door pair;
wherein in the first position, the slider plate extends beyond the slider housing to secure the first galley bay door to the second galley bay door in a closed state, and wherein in the second position, the slider plate is withdrawn into housing relative to the first position to allow opening the first galley bay door relative to the second galley bay door, wherein the slider housing includes detents configured to receive detent balls on the slider plate, wherein the detent balls are configured to engage a first set of detents to retain the slider plate in the first position, and a second set of detents to retain the slider plate in the second position, and wherein a portion of the slider plate extends beyond the slider housing in both the first position and the second position.

2. The system as recited in claim 1, wherein the slider plate is configured to displace at least 22 mm between the first and second positions.

3. The system as recited in claim 1, wherein the slider plate is configured to displace at least 30 mm between the first and second positions.

4. The system as recited in claim 1, wherein the slider handle is mounted to the slider plate for manual engagement to actuate the slider plate.

5. The system as recited in claim 4, wherein the slot of the slider housing is located in a dividing wall of the slider housing, wherein the dividing wall separates the slider plate from the slider handle, wherein the slider handle engages the slider plate through the slot in the dividing wall.

6. The system as recited in claim 1, further comprising:
a spacer block surrounding an outer periphery of the slider housing and clamped between the first galley bay door and the back plate.

7. A method comprising:
securing contents in a galley trolley with a door on the galley trolley; and
providing secondary retention for the contents in the galley trolley by closing the galley trolley inside a galley bay with the galley bay system of claim 1.

8. A method comprising:
securing contents in a galley trolley with a door on the galley trolley; and
providing secondary retention for the contents in the galley trolley by closing the galley trolley inside a galley bay with a first door of the galley bay and a second door of the galley bay, wherein the first door of the galley bay includes a slider for securing the first door of the galley bay to the second door of the galley bay in a closed position, the slider comprising:
a slider housing configured to be received through the first door of the galley bay and having a slot;
a back plate mounted to the housing, wherein the slider housing and back plate are configured to clamp the first door of the galley bay therebetween;
a slider plate mounted to the back plate, slidingly seated in a recessed channel of the slider housing for guiding the slider plate without a guide separate from the housing, and configured for sliding movement relative to the slider housing between a first position and a second position, wherein the recessed channel is open on both ends of the slider housing such that in the second position a portion of the slider plate extends beyond the recessed channel; and
a slider handle mounted through the slider housing, through the slot, and to the slider plate,
wherein the second door of the galley bay includes a strike plate configured to receive the slider plate of the slider in the first position, wherein the strike plate is mounted to the second door of the galley bay in a position that aligns the slider plate with an opening of the strike plate, wherein the slider housing includes detents configured to receive detent balls on the slider plate, wherein the detent balls are configured to engage a first set of detents to retain the slider plate in the first position, and a second set of detents to retain the slider plate in the section position, and wherein a portion of the slider plate extends beyond the slider housing in both the first position and the second position of the slider.

9. The method as recited in claim 8, wherein securing the first door of the galley bay in the closed position includes sliding the slider at least 22 mm.

10. The method as recited in claim 8, wherein securing the galley bay in a closed position includes securing the first door of the galley bay and the second door of the galley bay together.

* * * * *